United States Patent [19]

Beggs

[11] 4,049,440
[45] Sept. 20, 1977

[54] METHOD FOR PRODUCING METALLIC IRON PELLETS

[75] Inventor: Donald Beggs, Charlotte, N.C.

[73] Assignee: Midrex Corporation, Charlotte, N.C.

[21] Appl. No.: 611,099

[22] Filed: Sept. 8, 1975

Related U.S. Application Data

[63] Continuation-in-part of Ser. No. 578,477, May 19, 1975.

[51] Int. Cl.² .............................................. C21B 13/00
[52] U.S. Cl. ......................................... 75/35; 75/91
[58] Field of Search .................... 75/26, 34, 35, 90, 91

[56] References Cited

U.S. PATENT DOCUMENTS

| | | | |
|---|---|---|---|
| 3,764,123 | 10/1973 | Beggs et al. | 75/35 |
| 3,816,101 | 6/1974 | Beggs et al. | 75/35 |

Primary Examiner—M. J. Andrews
Attorney, Agent, or Firm—Ralph H. Dougherty

[57] ABSTRACT

A method of producing metallic iron pellets in a generally vertical furnace in which a gravitational flow of particulate material is reduced in a reducing zone by a countercurrent flow of a reducing gas containing a reductant, the spent reducing gas is removed and cooled and a portion is introduced as cooling gas in a cooling zone near the bottom of the furnace, and a portion of the cooling gas is upgraded in reducing potential and introduced to the reducing zone as reducing gas.

19 Claims, 2 Drawing Figures

METHOD FOR PRODUCING METALLIC IRON PELLETS

REFERENCE TO RELATED APPLICATION

This is a continuation-in-part application of my application Ser. No. 578,477, filed May 19, 1975.

BACKGROUND OF THE INVENTION

The recent high cost of scrap as a feed material for steelmaking furnaces has caused steelmakers to turn elsewhere for their raw materials. One recently attractive raw material is reduced iron in the form of sponge iron, iron particles, pellets, briquets, and the like, which has been produced by the direct reduction of iron oxides or iron ores. Such materials will hereinafter be referred to collectively as metallized pellets. These metallized pellets are well suited as feed material, particularly to an electric arc steelmaking furnace. As a result, there have been a number of processes developed for their production. To be an attractive feed material, the pellets should be at least 85 percent reduced, and preferably over 90 percent reduced.

U.S. Pat. No. 3,375,099 discloses a direct reduction process in which iron ores are reduced in a shaft furnace by contact with hot reducing gases generated by the incomplete combustion of a mobile fuel, such as natural gas, with oxygen. The spent reducing gases, which are also known as top gases or off gases, are withdrawn from the shaft furnace, cooled and reintroduced at the bottom of the furnace as cooling gases to cool the product. The cooling gas is then allowed to flow upwardly through the shaft furnace thus creating a closed circuit. It is also known that cooling of spent top gas enhances its reducing capacity. U.S. Pat. No. 3,748,120 teaches an improved method for reducing iron oxide to metallized iron, in which a reducing gas is catalytically reformed from a mixture of a gaseous hydrocarbon and spent reducing gas from the reduction process. Cooling gas is circulated through the bottom portion or cooling zone of a shaft furnace in a closed loop, that is, the cooling gas is not allowed to flow upwardly into the reducing zone. U.S. Pat. No. 3,799,521 teaches that allowing cooling gas to flow upwardly into the reducing zone of a shaft furnace is detrimental in that is does not permit fully independent control of the reduction and cooling steps of the process. It further points out that to achieve a particular desired degree of carburization, the composition and flow-rate of the coolant gas should be controllable independently of the conditions existing in the reduction zone of the furnace.

When spent top gas is used for cooling the pellet product as shown in U.S. Pat. No. 3,375,099, the gas which flows upwardly into the reducing zone (upflow gas) is not fully preheated, because the flow of cooling gas in actual practice must exceed the theoretical quantity required. That is, the thermal capacity of upflowing gas must exceed the thermal capacity of the descending burden. This precludes the cooling gas being fully preheated by the hot burden. Hot, fresh reducing gas enters the reducing zone through bustle pipes around the perimeter of the furnace forcing the upwardly flowing cooling gas to the center of the furnace, which results in cooling the central portion of the burden in the reducing zone. Further, when the spent top gas is not upgraded prior to introduction as cooling gas, it has poor reducing potential when it enters the reduction zone. These two factors combine to cause incomplete reduction of the burden with a resulting lesser metallization of the product.

OBJECTS OF THE INVENTION

It is the principal object of my invention to provide an improved method for directly reducing particulate metal oxide material to a metallized product in a shaft furnace in which the spent top gas is utilized as cooling gas, with a portion of the cooling gas being further utilized as a reductant in the reducing zone of the shaft furnace.

It is another object of my invention to provide a method of upgrading at least a portion of the cooling gas in reducing potential prior to utilizing it as reducing gas.

It is also an object of my invention to provide a method of enriching the spent top gas with a gaseous hydrocarbon prior to utilizing the enriched gas as a cooling gas.

BRIEF DESCRIPTION OF THE DRAWINGS

My invention is better understood by referring to the following detailed specification and the appended drawings in which.

DETAILED DESCRIPTION

Figure 1:
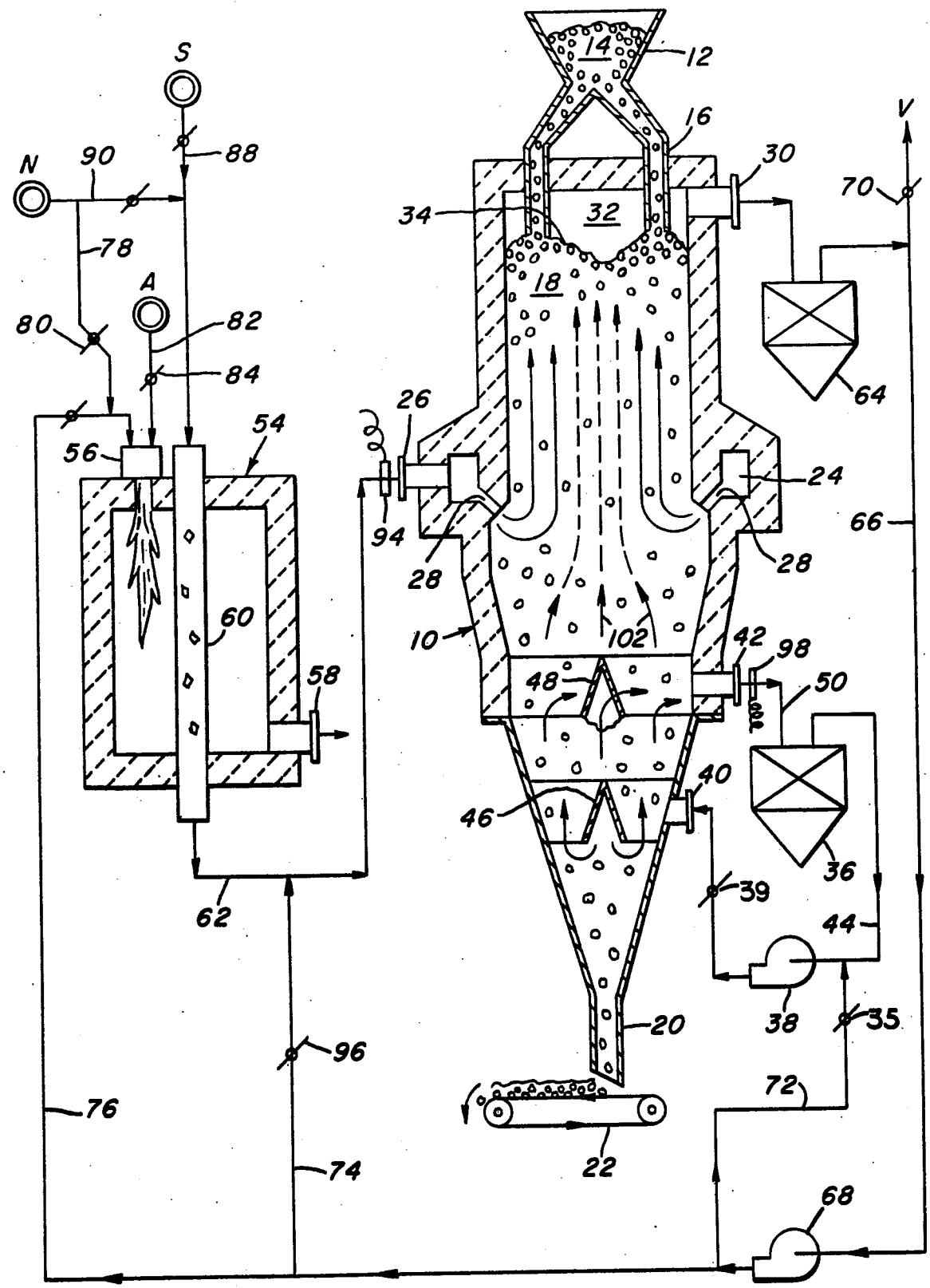
FIG. 1 is a schematic drawing of a vertical shaft furnace and its associated equipment for utilizing one method of upgrading the reducing potential of a portion of cooling gas prior to utilizing it as a reducing gas.

A direct reduction process has been developed for producing high quality metallized pellets with an extremely high degree of thermal efficiency.

The process employs a vertical shaft type furnace having a reducing zone in the upper region of the furnace and a cooling zone in the lower region of the furnace. Hot reducing gas from any external source is introduced to the reducing zone. For the purpose of overall process description, the reducing gas utilized herein consists principally of CO and $H_2$ produced by the continuous catalytic reforming of a hydrocarbon such as natural gas, petroleum distillates, methane, ethane, propane, butane, or other readily vaporizable hydrocarbon. The continuous catalytic reforming is accomplished in a reforming furnace which employs an indirectly heated catalyst bed. The metallized pellets are cooled by recirculating a cooling gas through a cooling gas circuit in the cooling zone of the reduction furnace. Top gas from the reduction furnace is admitted to this circuit. The process embraces improvements in the technology of cooling directly reduced metallized pellets, which is important not only with respect to thermal efficiency of the process, but also with respect to obtaining a high degree of metallization of the pellets in a reasonable time. The process is extremely well suited for the production of iron-and-steel-making grade metallized pellets. It will therefore be so described.

The metallized product, which is at least 85 percent reduced and preferably at least 90 percent reduced is produced in a generally vertical shaft furnace having an upper reducing zone and a lower cooling zone. A gravitational flow of metal oxide material or burden is established by charging particulate metal oxide material to the upper portion of the furnace and removing the metallized product from the bottom of the furnace. A hot reducing gas having CO and H₂ as reductant components is introduced to the flow of material through a bustle pipe and tuyere inlet system intermediate the ends of the furnace, flows countercurrent through the material, reducing a substantial portion of the metal oxide, and forms a top gas. The top gas is removed from the upper portion of the furnace, cooled, and divided into two portions. The first portion is introduced to a cooling gas circuit which introduces cooling gas to the cooling zone through an inlet near the lower end of the furnace. The cooling gas flows upwardly and a portion of it is removed at the top of the cooling zone, scrubbed and cooled, and recirculated in a closed loop. Cooled top gas (make-up gas) is added to the removed cooling gas and the mixture is directed to the furnace through the cooling gas inlet. An amount of cooling gas substantially equal to the amount of make-up gas flows upwardly into the reducing zone, is heated by the hot particulate material, and acts as reducing gas. To effectively cool the hot burden, the flow of cooling gas admitted to the cooling zone must exceed the theoretical quantity, i.e., the thermal capacity of the coolig gas must exceed the thermal capacity of the descending burden. To effectively preheat the portion of cooling gas which flows upwardly into the reducing zone, the flow of this portion must be less than the theoretical quantity, i.e., the thermal capacity of the descending burden must exceed the thermal capacity of the upflow gas. Thermal capacity of a substance is the product of the specific heat of the substance times the flow. The specific heat units could be expressed as BTUs per pound of substance, and the flow units as pounds per hour. Thus, the thermal relationship of gas to burden can be expressed:

$$C_g \times W_g \times \Delta T_g = C_b \times W_b \times \Delta T_b$$

where:
$C_g$ = gas specific heat
$W_g$ = gas flow
$\Delta T_g$ = gas heat change in degrees
$C_b$ = specific heat of the burden
$W_b$ = flow of the burden
$\Delta T_b$ = burden heat change in degrees
Specific heat is a constant for each substance.

To effectively cool the burden in the cooling zone, the gas flow rate relative to the burden flow rate must be adjusted so the gas heat change in degrees will be less than the burden heat change in degrees, as will be readily understood by one skilled in the art of gas to solids counterflow heat exchange. Similarly, to effectively and fully preheat the portion of cooling gas which upflows into the reducing zone, this upflow gas flow rate relative to the burden flow rate must be such that the gas heat change in degrees is greater than the burden heat change in degrees. The cooling arrangement of the present invention comprehends both effective cooling of the burden and effective preheating of the portion of cooling gas flowing upwardly into the reducing zone. The second portion of the cooled top gas may be introduced to a reformer furnace as a fuel to heat a catalyst in a tube in such furnace. A gaseous hydrocarbon and steam are passed through the catalyst, forming a reductant-containing reducing gas which is introduced to the reduction zone of the furnace through the tuyere inlet.

Referring now to FIG. 1, a vertical shaft furnace 10 has a feed hopper 12 mounted at the top thereof into which iron oxide pellets 14 or other material such as lump ore are charged. The pellets descend by gravity through a plurality of feed pipes 16 to form a bed 18 of particulate iron oxide containing material, or burden, in the shaft furnace. The upper portion of the shaft furnace 10 comprises a reducing zone while the lower portion of the furnace comprises a cooling zone. A pellet discharge pipe 20 is located at the bottom of shaft furnace 10. Reduced material is removed from the furnace by discharge conveyor 22 located beneath discharge pipe 20. Removal of the metallized pellets from discharge pipe 20 establishes gravitational flow of the particulate iron oxide burden in shaft furnace 10.

At the upper portion of the shaft furnace 10 is a bustle and tuyere system, indicated generally at 24, having gas ports 28 through which hot reducing gas is introduced to flow upwardly in counterflow relationship to the movement of the burden 18. The spent top gas exits the furnace through gas takeoff pipe 30 at the top of the furnace. The lower end of pellet feed pipe 16 extends below takeoff pipe 30, which arrangement creates a reacted gas disengaging plenum 32 which permits the gas to exit generally symmetrically from the pellet stock line 34 and flow freely to the takeoff pipe 30.

A cooling gas loop recirculating circuit is provided at the cooling zone of the furnace to final cool the pellets prior to their discharge. This circuit includes a scrubber-cooler 36, a recirculating gas blower 38, flow-control valve 39, a gas inlet 40 and a gas outlet 42. The blower 38 is located in inlet pipe 44 leading from the scrubber-cooler to the inlet 40. Inlet 40 leads to a gas distributing member 46 located within the furnace 10. Cooling gas collecting member 48 is positioned above the gas distributing member 46 and is connected to scrubber-cooler 36 by pipe 50. Generally, that portion of the furnace, between and including members 46 and 48, comprises the cooling zone which forms an integral part of the cooling gas loop recirculating circuit.

A reformer furnace 54, having fuel fired burners 56, a flue pipe 58 and a plurality of indirect heat exchanger catalyst tubes 60, which are externally heated, only one being shown, generates hot reducing gas. The reducing gas flows from the catalyst tubes 60 to the bustle and tuyere system 24 through gas pipe 62.

The spent top gas, leaving the shaft furnace 10 through the takeoff pipe 30, flows to a scrubber-cooler 64 wherein the gas is cooled and the dust particles are removed. Pipe 66 leads from scrubber-cooler 64 to a gas blower 68. Pipe 66 contains a valve 70 in the line for venting cooled top gas via vent 2, if such is desired. Blower 68 is required to circulate the top gas from the scrubber-cooler through pipes 72, 74, and 76. Pipe 72 admits a portion of the top gas to the cooling gas recirculatig system at cooling gas pipe 44. Pipe 74 connects to gas pipe 62 to introduce scrubbed and cooled top gas to the hot reformed gas from the reformer furnace to reduce its temperature prior to introducing it to the reduction furnace. Pipe 76 transmits the remaining spent top gas to the reformer furnace as fuel to be used as a source of heat.

A source of a gaseous hydrocarbon such as natural gas delivers such gas to burner 56 through pipe 78 having a flow control valve 80 therein. Combustion air from the burner 56 in the reforming furnace is supplied from source A through pipe 82 having a flow control valve 84 therein. Steam from source S and a gaseus hydrocarbon from source N are introduced to the catalyst tubes 60 through pipes 88 and 90 respectively each of which has a flow control valve therein. Alternatively, the reforming oxidant from source S can be $CO_2$ and water vapor from spent reducing furnace top gas.

A temperature sensing element 94 adjacent reducing gas inlet 26 controls the flow of top gas through flow control valve 96 in pipe 74 to balance the flows of hot reducing gas from the reformer and the cooled top gas so the reducing gas mixture entering inlet 26 will be at the desired temperature.

Temperature sensing element 98 located adjacent cooling gas outlet 42 controls valve 39 to maintain the desired exit temperature of the cooling gas at outlet 42.

The hot reducing gas admitted to the shaft furnace 10 through gas introduction ports 28 has a reductant ($H_2$ + CO) to oxidant ($H_2O$ + $CO_2$) ratio of about 8. The spent top gas in pipe 66 after having been scrubbed and cooled in scrubber-cooler 64 has a reductant to oxidantratio of about 5, containing for example 14% $CO_2$, 3% $H_2O$, and 83% $H_2$ + CO. Because it has a lower reductant to oxidant ratio the spent top gas, even after cooling, is a poor quality reducing gas having poor reducing potential.

It has been found that reduced iron pellets are a good catalyst for the well-known reversible water-gas shift reaction.

$$CO + H_2O \rightleftarrows CO_2 + H_2$$

At a temperature of about 800° to 1100° F, and preferably about 1000° F, the water-gas shift reaction appreciably lowers the $CO_2$ content of the cooling gas in the cooling zone while simultaneously raising the $H_2O$ content an equivalent amount. The water vapor thus produced is condensed and removed in the scrubber-cooler 36. The gas which reenters the cooling zone through distributor 46 and flows upwardly from the cooling zone into the reducing zone as indicated by arrows 102 has a reductant to oxidant ratio of about 6.5. Although the preferred cooling gas temperature as monitored at temperature sensing element 98 is about 1000° F the process operates well at temperatures from about 800° to about 1100° F (about 425° to about 600° C).

Table 1 shows the effect of temperature of the cooling gas outlet 42 on the reductant to oxidant ratio of the cooling gas allowed to flow upwardly as reductant. In this example the reductant to oxidant ratio of the spent top gas entering the cooling system through pipe 72 is 5.25. Note that the ratio of thermal capacities of gas to burden is constant above the cooling zone, but varies in the cooling zone. This occurs because the specific heat of each substance, burden, and gas, varies with temperature. The temperature of the burden as it enters the cooling zone is always about the same, the exit temperature of the cooling gas varying according to the cooling gas flow rate.

Whereas in prior processes, cooling gas allowed to flow upwardly through the burden as reductant was not fully heated when reaching the reducing zone and cooled the burden center, the invented process overcomes that disadvantage. By controlling cooled top gas added to the cooling loop recirculating circuit through flow control valve 35, the upwardly flowing gas 102 is fully preheated by the descending hot particulate material before the gas enters the reduction zone.

Thus, the upflow gas is upgraded in three stages: first, the spent top gas is cooled to remove water vapor and increase its reducing capacity; second, water vapor formed in the cooling zone is removed from the removed cooling gas, whereby the reductant to oxidant ratio is further increased; and third, the upflow gas is preheated by the descending burden to the required preheat temperature before it enters the reducing zone.

Figure 2:
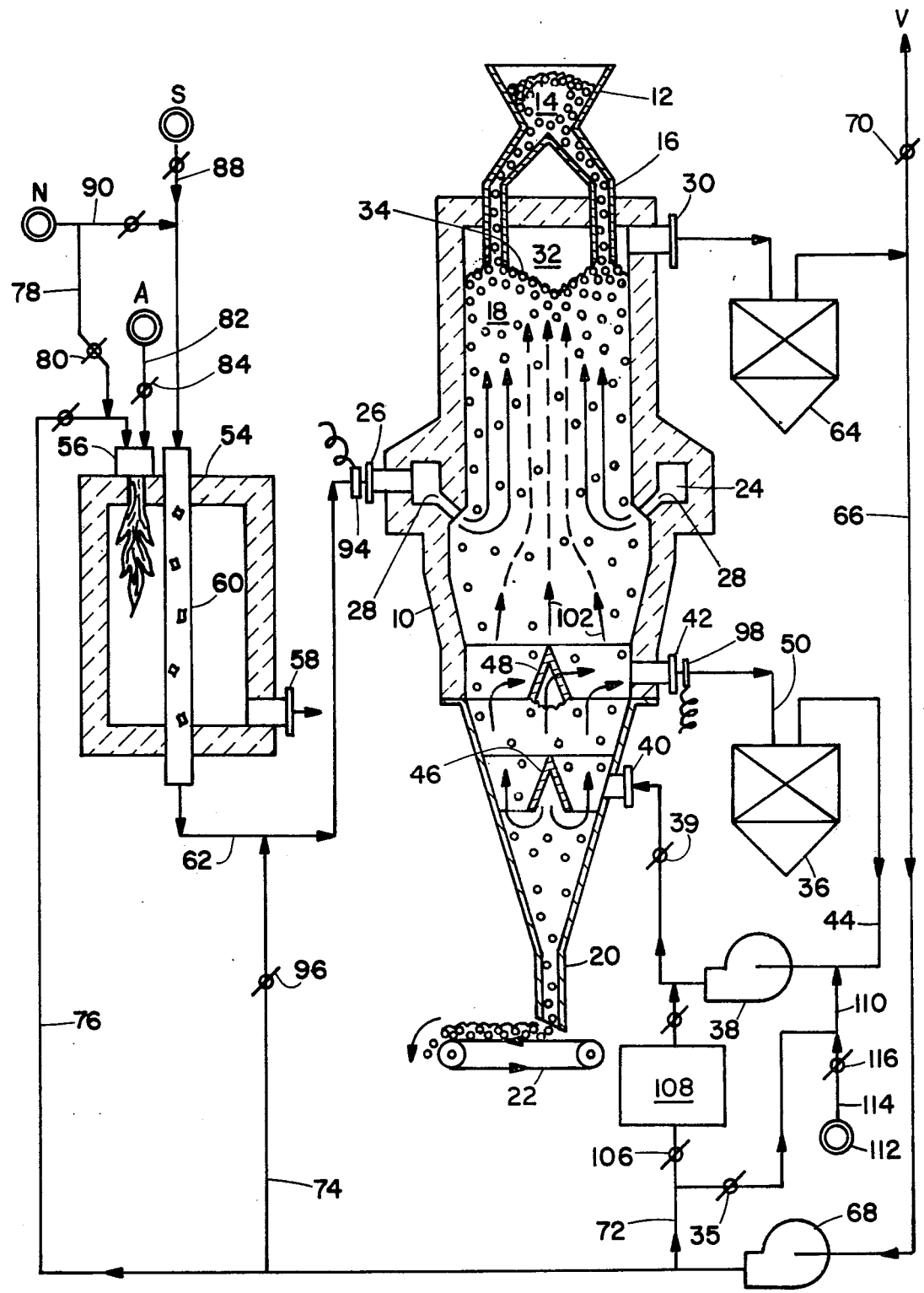
FIG. 2 is a schematic drawing similar to FIG. 1 showing two alternative methods of upgrading the reducing potential of a portion of the cooling gas prior to utilizing it as a reducing gas.

In an alternative embodiment shown in FIG. 2, the portion of top gas which is admitted to the cooling circuit through pipe 72 does not pass through flow control valve 35, but instead is passed through flow control valve 106 and a $CO_2$ removal tower 108 which can be a part of a conventional $CO_2$ removal system such as the commonly used monoethanolamine system. By removing $CO_2$ from this portion of top gas prior to admitting it to the cooling zone circuit, its reducing potential is increased external of the cooling zone. The upflow gas which enters the reducing zone thus has good reducing potential and the flow rate of upflow gas relative to the descending burden flow rate is maintained in proper relationship to insure adequate preheating of the upflow gas.

In the second alternative embodiment of FIG. 2, valve 106 is closed and valve 35 is opened to admit top gas to pipe 110. Natural gas, or other hydrocarbon vapor from a source 112, is admitted to pipe 110 through pipe 114. The flow of this hydrocarbon vapor is regulated by valve 116. The portion of top gas which is admitted to the cooling zone circuit through pipes 72 and 110 contains $CO_2$ and residual water vapor, both of which are reforming oxidants for the reforming of a hydrocarbon such as methane to form CO and $H_2$. The well-known methane reforming reactions are as follows:

$$CH_4 + CO_2 \rightarrow 2H_2 + 2CO$$

$$CH_4 + H_2O \rightarrow 3H_2 + CO$$

U.S. Pat. No. 3,375,098 discloses the addition of a hydrocarbon vapor to a portion of cooled top gas from a shaft type reduction furnace. This mixture of hydrocarbon vapor and cooled top gas is then admitted to a lower region of the shaft furnace to serve as the cooling gas, and is in turn permitted to upflow into the reduction zone where some reforming will occur, thus upgrading the upflow gas in reducing potential. However, with the arrangement disclosed in U.S. Pat. No. 3,375,098 the amount of reforming is insufficient to be very effective since the large amount of cooling gas required to adequately cool the descending burden is too great to be properly preheated to accomplish any meaningful amount of upflow gas reforming.

In the present invention, the effective final cooling of the burden is accomplished independently of the amount of upflow gas by means of the cooling loop recirculating circuit as described above. The flow rate of cooled, hydrocarbon enriched, top gas admitted to the cooling circuit is controlled, relative to the burden flow rate, to insure the upflow gas being fully preheated and reformed to upgrade its reducing potential.

It should be noted that the introduction of cooled top gas into the cooling loop recirculatig circuit can be at any point in the loop in addition to those shown in the drawing. For instance, the cooled top gas may be introduced directly to the cooling zone, or to the circuuit, either before or after cooler scrubber 36. Of course, the cooled top gas may be either in the untreated, enriched, or CO₂-removed forms.

As can readily be seen from the foregoing, I have invented an improved process for the direct reduction of metal oxides to metallized pellets with a greater thermal efficiency than heretofore possible.

TABLE I

| Exit Temperature of Cooling Gas | Cooling Gas Flow Rate Through the Cooling Zone in Normal Cubic Meters Per Metric Ton | Ratio of Thermal Capacity of Gas in Cooling Zone to Thermal Capacity of Descending Burden | Gas Up-Flow in Normal Cubic Meters Per Metric Ton | Ratio of Thermal Capacity of Up-Flow Gas to Thermal Capacity of Descending Burden | Reductant to Oxidant Ratio of Up-Flow Gas |
|---|---|---|---|---|---|
| 800 F (425 C) | 922 | 1.83 | 318 | 0.5 | 5.96 |
| 900 F | 804 | 1.60 | 328 | 0.5 | 6.32 |
| 950 F | 755 | 1.51 | 334 | 0.5 | 6.43 |
| 1000 F | 711 | 1.42 | 341 | 0.5 | 6.48 |
| 1050 F | 672 | 1.35 | 351 | 0.5 | 6.47 |
| 1100 F (600 C) | 637 | 1.28 | 363 | 0.5 | 6.41 |

What is claimed is:

1. A method for producing a metallized product comprising:
   a. establishing a gravitational flow of particulate metal oxide material by charging the particulate metal oxide material to the upper portion of a generally vertical furnace having an upper reducing zone and a lower cooling zone, and removing the metallized product from the bottom of the furnace;
   b. introducing a reducing gas to the gravitational flow of material at a temperature sufficient to promote a reducing reaction between said reducing gas and said material at a first inlet intermediate the ends of the furnace;
   c. causing said reducing gas to move countercurrent through the gravitational flow of material, react with and reduce a substantial portion of the metal oxide and form a top gas;
   d. removing said top gas from the upper portion of the furnace;
   e. cooling said top gas;
   f. introducing a cooling gas into a second inlet near the lower end of said furnace;
   g. removing a portion of said cooling gas from said furnace at a location intermediate said first and second inlets;
   h. cooling the removed portion;
   i. introducing the cooled removed portion to said second inlet to form a recirculating circuit including the cooling zone;
   j. adding cooled top gas to said recirculating circuit; and
   k. causing a second portion of said cooling gas, in an amount substantially equal to the amount of cooled top gas added to said recirculating circuit, to flow upwardly through the gravitational flow of material, become heated thereby, and to flow into and act as a reducing gas in the reducing zone;
   whereby, that portion of said cooling gas flowing upwardly through the gravitational flow of material has a greater reducing potential than the spent top gas, and is thus an effective reductant.

2. A method according to claim 1 wherein cooled top gas is added to the removed portion of said cooling gas.

3. A method according to claim 1 wherein said removed portion of said cooling gas is upgraded in reducing potential by removing water therefrom, thereby increasing the reductant to oxidant ratio.

4. A method according to claim 1 wherein said reducing gas is a reformed vaporizable hydrocarbon.

5. A method according to claim 4 wherein said hydrocarbon is selected from the group comprising natural gas, petroleum distillates, methane, ethane, propane, butane.

6. A method according to claim 4 wherein said hydrocarbon is natural gas.

7. A method according to claim 1 wherein said removed and cooled top gas is separated into a first portion and a second portion, and said second portion is introduced as a fuel into a furnace containing a tube having catalyst therein.

8. A method according to claim 1 wherein a gaseous hydrocarbon and steam are passed through a heated catalyst to form said reducing gas for introduction into said first inlet.

9. A method according to claim 7 wherein said second portion of said cooled top gas is mixed with a gaseous hydrocarbon to form the fuel mixture to heat said catalyst.

10. A method according to claim 1 further comprising mixing a second portion of said cooled top gas with said reducing gas and introducing the mixture to said first inlet whereby the resulting mixture will have the proper proportion of hot reducing gas and cooled top gas to bring the temperature of the mixture to the desired inlet temperature.

11. A method according to claim 1 wherein said particulate metal oxide material is iron oxide.

12. A method according to claim 1 further comprising controlling the rate of flow of cooling gas introduced to said second inlet to maintain the temperature of the portion of said cooling gas being removed from said furnace at between about 800° to 1100° F.

13. A method according to claim 11 wherein the removed cooling gas temperature is maintained at about 1000° F.

14. A method according to claim 1 wherein said top gas contains carbon dioxide, said method further comprising after step (e) removing carbon dioxide from at least a portion of said cooled top gas prior to introducing cooled top gas to the recirculating circuit, thereby upgrading the reducing potential of said cooled top gas.

15. A method according to claim 1 further comprising adding a gaseous hydrocarbon to said cooling gas prior to introducing said cooling gas into said second inlet, whereby said added gaseous hydrocarbon is reformed in the furnace to a highly effective reductant.

16. A method for producing metallized iron pellets comprising:
   a. establishing a gravitational flow of iron oxide material in a vertical shaft furnace;
   b. introducing a gaseous reductant at an intermediate location within said furnace through a first inlet;
   c. causing said gaseous reductant to move in counterflow relationship through the descending iron oxide material, reacting with said material, reducing a substantial portion of the iron oxides therein and forming spent top gas;

d. removing the top gas which is the reacted gaseous reductant from the upper portion of the furnace;

e. cooling said top gas;

f. introducing a portion of the cooled top gas to a recirculating cooling gas circuit as a cooling gas directed into the vertical shaft furnace at a second inlet below said first inlet whereby said cooling gas is in direct heat exchange relationship with the descending material;

g. causing a first portion of said cooling gas to flow upwardly from said cooling gas circuit and act as reductant, said first portion being substantialy equal to the amount of cooled top gas introduced to said cooling gas circuit;

h. removing a second portion of the cooling gas from said furnace at an outlet intermediate to said first and second inlets;

i. removing from said removed cooling gas a portion of the water contained therein;

j. cooling said removed cooling gas; and k. introducing the cooled and removed cooling gas into the second inlet, whereby the cooled top gas and removed cooling gas together upon reacting with the metallized material between said second inlet and said outlet have a greater reducing potential than does the spent top gas.

17. A method according to claim 16 further comprising after step (e) removing carbon dioxide from at least a portion of said cooled top gas prior to its introduction to said cooling gas circuit.

18. A method according to claim 16 further comprising adding a gaseous hydrocarbon to said cooling gas prior to introducing said cooling gas into said second inlet, whereby said added gaseous hydrocarbon is reformed in the furnace to a highly effective reductant.

19. A method according to claim 16 wherein said cooled and removed cooling gas is mixed with a portion of said cooled top gases before introduction to said second outlet as a cooling gas.

* * * * *